United States Patent Office 3,325,478
Patented June 13, 1967

3,325,478
α-AMINO-1-ADAMANTYLMETHYL PENICILLINS
Edward C. Hermann, Newark, and Jack A. Snyder, Claymont, Del., assignors to E. I. du Pont de Nemours and Company, Wilmington, Del., a corporation of Delaware
No Drawing. Filed Aug. 9, 1966, Ser. No. 571,183
3 Claims. (Cl. 260—239.1)

This application is a continuation-in-part of copending application S.N. 411,690 filed Nov. 17, 1964, now abandoned.

This invention relates to synthetic penicillins having the α-amino-1-adamantylmethyl side chain.

The α-amino-1-adamantylmethyl penicillins within the scope of this invention are represented by the following formula:

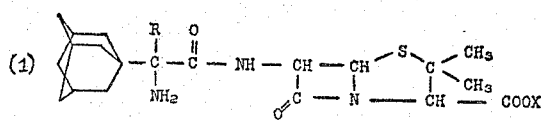

where R is hydrogen or methyl; and X is hydrogen or a non-toxic anion.

The compounds of Formula 1 are synthetic penicillins. "Riegel's Industrial Chemistry," editor, James A. Kent, Reinhold Publishing Corporation, New York, N.Y., 1962, p. 204, discusses the importance of synthetic penicillins.

Economical methods have recently been found for removing the phenylacetyl side chain from penicillin G, leaving intact the nucleus, 6-aminopenicillanic acid. A large number of "synthetic penicillins" have been made by chemically coupling new side chains in the hopes of altering the range of therapeutic usefulness of the fundamental unit. Such improvements include resistance to penicillinase (an enzyme found in penicillin-resistant Staphylococci) which inactivates the compound by opening the β-lactam ring. Others include enhanced activity against gram-negative bacteria.

We have found that the use of an α-amino-adamantylmethyl side chain having no or one methyl group on the methyl carbon gives synthetic penicillins which exhibit excellent acid-sensitivity and resistance to penicillinase. The preferred compound due to its outstanding stability is α-amino-α-methyl-1-adamantylmethyl penicillin.

The penicillins of the invention have a broad spectrum of action, which appears to be due to the presence of the amino group on the adamantylmethyl side chain.

This invention embraces the non-toxic salts of the basic penicillin structure of Formula 1 when X is hydrogen. Forming the salt enhances the usefulness of the basic penicillin structure by giving improved water-solubility and by improving acid stability due to the alkaline character of the salt. The two most preferred salts are the sodium and potassium salts. Representative of these salts are:

sodium α-amino-1-adamantylmethyl penicillin
potassium α-amino-1-adamantylmethyl penicillin
sodium α-amino-α-methyl-1-adamantylmethyl penicillin
potassium α-amino-α-methyl-1-adamantylmethyl penicillin However, it is to be understood that other salts of the basic penicillin structure of the invention which utilize a non-toxic anion are also included within the compound scope of the invention. Illustrative of such other salts are the salts with organic bases such as procaine, chloroprocaine, hydrabamine [N,N-bis-(dehydroabietyl)ethylenediamine].

The penicillins of this invention are prepared by the reaction of the thiophenyl ester hydrochloride of the appropriate α-amino-1-adamantaneacetic acid with 6-aminopenicillanic acid in sodium or potassium hydrogen succinate buffer at about 37° C. After reaction, the mixture is acidified to about pH 2 with hydrochloric acid, and the thiophenol and succinic acid are removed by ether extraction. The aqueous residue is adjusted to about pH 4.6 with sodium or potassium bicarbonate solution, and the solution is vacuum-concentrated at less than 35° C. until crystals of the sodium or potassium α-amino-1-adamantylmethyl penicillin separate.

The penicillins of this invention may also be prepared by the reaction of the carboxyanhydride of the appropriate α-amino-1-adamantaneacetic acid with the sodium or potassium salt of 6-aminopenicillanic acid in aqueous acetone at temperatures between −15° C. and 50° C. This is an easy, excellent method of synthesis which has the highly practical advantage of avoiding the use of odorous, offensive thiophenol.

The preparation of the α-amino-1-adamantaneacetic acids and their thiophenyl ester hydrochlorides and carboxyanhydrides is discussed fully in the following specific examples of the synthesis of the compounds of this invention.

EXAMPLE 1

*Sodium α-amino-α-methyl-1-adamantylmethyl penicillin*

A mixture of 55.0 g. (1.0 mole) of ammonium chloride and 62 g. of 28% ammonium hydroxide is added to a solution of 65 g. (1.0 mole) of potassium cyanide in 240 ml. of water. With good shaking, a solution of 1.0 mole of 1-adamantyl methyl ketone (H. Stetter and P. Goebel, Ber., 95, 1039 (1962); H. Stetter and E. Rauscher, Ber. 93, 2054 (1960) in 600 ml. of ethanol is added, and the resulting mixture is heated at 60° C. for 5 hours. It is cooled to 0° C. and poured into 800 ml. of cold conc. hydrochloric acid. This mixture is saturated with hydrogen chloride gas, and is allowed to stand at 5° C. for 6 hours. Then, it is diluted with 1000 ml. of water and heated at reflux for 3 hours. The solution is cooled, decolorized with charcoal, and evaporated to dryness in a vacuum. The solids are triturated with ether, and separated by filtration. They are dissolved in water and the solution is treated with a slight excess of silver carbonate. The precipitate of silver chloride is filtered and the filtrate is made slightly acidic with acetic acid and then saturated with hydrogen sulfide gas. The precipitate of silver sulfide is filtered, and the filtrate is vacuum-concentrated. The residue is an α-amino-α-methyl-1-adamantaneacetic acid.

A suspension of 0.265 mole of α-amino-α-methyl-1-adamantaneacetic acid in 1000 ml. of methylene dichloride plus 4 ml. of dimethyl formamide is cooled to −5° C., and 80 g. of phosphorus pentachloride is added. The mixture is stirred for 15 min. at ice-bath temperature and is then allowed to warm to room temperature and stir for one hour. The solid, which is α-amino-α-methyl-1-adamantaneacetyl chloride, hydrochloride, is filtered. It is added to an ice-cold mixture of 100 ml. of dimethyl formamide and 44.1 g. of thiophenol. This is stirred for 15 minutes, and then allowed to warm to room temperature and stir 1.5 hours. The mixture is diluted with 1500 ml. of ether, and, after crystallization has occurred, the ether is decanted. The solids are washed with dry ether and then with acetone, and dried. This is α-amino-α-methyl-1-adamantaneacetic acid, thiophenyl ester, hydrochloride.

A mixture of 3.37 g. (0.010 mole of α-amino-α-methyl-1-adamantaneacetic acid, thiophenyl ester, hydrochloride, 2.16 g. (0.010 mole) of 6-aminopenicillanic acid and 675 ml. of 0.1 M sodium hydrogen succinate is heated at 37° C. for 6 hours. It is cooled to 0° C. and adjusted to pH 2 with 1 N hydrochloric acid. Keeping it at 0° C., the solution is extracted with three 50-ml. portions of ether. The aqueous layer is adjusted to pH 4.65 with 3% aqueous sodium bicarbonate, and is vacuum-concentrated at less than 35° C. The solids which separate are filtered and dried.

This is sodium α-amino-α-methyl-1-adamantylmethyl penicillin.

If 0.1 M potassium hydrogen succinate is substituted for the 0.1 M sodium hydrogen succinate, and if the pH is adjusted to 4.65 with 3% aqueous potassium bicarbonate instead of 3% aqueous sodium bicarbonate, the product is potassium α-amino-α-methyl-1-adamantylmethyl penicillin.

EXAMPLE 2

*Sodium α-amino-1-adamantylmethyl penicillin*

If 1.0 mole of 1-admantanecarboxaldehyde (H. Stetter and E. Rauscher, Ber., 93, 1161 (1960)) is substituted for the 1.0 mole of 1-adamantyl methyl ketone of Example 1, sodium α-amino-1-adamantylmethyl penicillin is obtained.

EXAMPLE 3

*Sodium α-amino-1-adamantylmethyl penicillin*

A 1.88 g. (0.00790 mole) amount of 6-aminopenicillanic acid was suspended in 5 ml. of water and 0.66 g. (0.00790 mole) of sodium bicarbonate was added in small portions. A 1.8 g. (0.00765 mole) quantity of α-amino-1-adamantaneacetic acid N-carboxyanhydride was dissolved in 15 ml. of acetone, placed in an 8″ test tube with a thermometer, and cooled to −25° C. in a solid carbon dioxide-acetone bath. The 6-aminopenicillanic acid-sodium bicarbonate-water mixture was added, using 2.5 ml. of water to make the transfer, and the mixture was stirred and kept at −15° C. to −10° C. for 15 minutes, and then was allowed to warm to room temperature (with occasional stirring) and stand 90 minutes. The solids were filtered and discarded. The filtrate was vacuum-evaporated to remove the acetone, and then was freeze-dried to yield 2.22 g. of sodium α-amino-1-adamantylmethyl penicillin as a light tan powder, melting at 245° C. (decomposition). The IR spectrum showed both beta-lactam and amide bands, as expected.

To prepare α-amino-1-adamantaneacetic acid N-carboxyanhydride, a 250-ml. round-bottom flask was fitted with a magnetic stirrer bar, a thermometer, a gas inlet, and a condenser with an outlet leading through a drying tube to a gas washing tower. The flask was charged with 100 ml. of spectro quality dioxane and 2.14 g. of dry α-amino-1-adamantaneacetic acid hydrochloride. The mixture was stirred and heated at 40° C. to 45° C. for 4 hours while a small stream of phosgene was passed in. Phosgene passage was stopped, and the mixture was stirred for an additional 2 hours at 40° C. to 45° C. The solids (0.4 g.) were filtered and discarded. The filtrate was vacuum-evaporated at 50° C., yielding a colorless oil. Then, 25 ml. of ether was added. Crystals formed, and the ether was removed by vacuum evaporation to yield an off-white, crystalline residue of α-amino-1-adamantaneacetic acid N-carboxyanhydride amounting to 1.8 g.

To prepare α-amino-1-adamantaneacetic acid hydrochloride, 8.2 g. of 1-adamantylglyoxylic acid oxime was added to a mixture of 8.4 g. of zinc dust and 105 ml. of 50% aqueous acetic acid, and the mixture was heated at reflux for 7 hours. It was coled and filtered, and 100 ml. of water was added. This solution was saturated with hydrogen sulfide gas, and the resulting zinc sulfide was filtered. The filtrate was vacuum-evaporated to dryness, 10 ml. of water was added to the resdue and dilute hydrochloric acid was added until a clear solution was obtained. This solution was back-titrated with dilute sodium hydroxide to pH 7.0, and the resulting precipitate was filtered. It was again suspended in 10 ml. of water and dilute hydrochloric acid was added until a clear solution was obtained. This was vacuum-evaporated and dried to yield 2.4 g. of α-amino-1-adamantaneacetic acid hydrochloride, melting above 320° C. (decomposition).

To prepare 1-adamantylglyoxylic acid oxime, 28 ml. of 4 N sodium hydroxide was added to a mixture of 10.4 g. of 1-adamantylglyoxylic acid and 4.2 g. of hydroxylamine hydrochloride. The mixture was heated at 60° C. for 2 hours, then was cooled and 25 ml. of 5 N hydrochloric acid was added. The oxime was extracted with four 50-ml. portions of ether, and these were combined, dried with anhydrous magnesium sulfate, and vacuum-evaporated to yield 8.2 g. of 1-adamantylglyoxylic acid oxime melting at 152–153° C., then resolidifying and remelting at 174–176° C.

To prepare 1-adamantylglyoxylic acid, an alkaline potassium permanganate solution was prepared by dissolving 126 g. of potassium permanganate and 40 g. of sodium hydroxide in 4000 ml. of water. A 2800-ml. portion of this solution was cooled to 5° C. and stirred vigorously while a solution of 50 g. of 1-acetyladamantane in 700 ml. of carbon tetrachloride was added. The mixture was stirred vigorously and allowed to come to room temperature and then was stirred for an additional 24 hours at room temperature. The manganese dioxide was removed by filtration, and the filtrate was adjusted to pH 7 with 10 N sulfuric acid. The volume of this pH-adjusted filtrate was reduced to 700 ml. by vacuum evaporation. It was then taken to pH 1 with 10 N sulfuric acid and extracted with three 150-ml. portions of ether. The ether extracts were combined and dried with anhydrous magnesium sulfate, and the ether was removed by vacuum evaporation to yield a solid residue. This was recrystallized from ethanol-water to yield 17 g. of 1-adamantylglyoxylic acid melting at 102–104° C.

EXAMPLE 4

*Sodium α-amino-α-methyl-1-adamantylmethyl penicillin*

Substitution of 1.9 g. of α-amino-α-methyl-1-adamantaneacetic acid N-carboxyanhydride for the 1.8 g. of α-amino-1-adamantaneacetic acid N-carboxyanhydride of Example 3, yields sodium α-amino-α-methyl-1-adamantylmethyl penicillin.

Substitution of 2.26 g. of α-amino-α-methyl-1-adamantaneacetic acid hydrochloride for the 2.14 g. of α-amino-1-adamantaneacetic acid hydrochloride of Example 3, yields α-amino-α-methyl-1-adamantaneacetic acid N-carboxyanhydride.

To prepare α-amino-α-methyl-1-adamantaneacetic acid hydrochloride, a mixture of 24.8 g. of 5-(1-adamantyl)-5-methylhydantoin, 34 g. of potassium hydroxide, 310 ml. of methanol and 90 ml. of n-butyl alcohol is heated at 160° C. to 200° C. for 20 hours in a suitable sealed vessel. The reaction is cooled, and the contents are diluted with 400 ml. of water, and then taken to pH 1 with concentrated hydrochloric acid. The mixture is vacuum-evaporated, and the solid residue is ground with 50 ml. of water. The mixture is filtered, the solids are discarded, and the filtrate is back-titrated with dilute sodium hydroxide to pH 7.0. The resulting precipitate is filtered, suspended in 50 ml. of water, and dilute hydrochloric acid is added until a clear solution is obtained. This is vacuum-evaporated and dried to yield solid α-amino-α-methyl-1-adamantaneacetic acid hydrochloride.

To prepare 5-(1-adamantyl)-5-methyldantoin, a 500-ml. round-bottom flask fitted with a stirrer, a thermometer and a condenser and arranged for heating with a mantle is charged with 42.6 g. (0.44 mole) of ammonium carbonate, 110 ml. of water, and 7.5 g. (0.108 mole) of potassium cyanide. The mixture is stirred and heated to 60° C., and a solution of 17.8 g. (0.100 mole) of 1-acetyladamantane in 110 ml. of ethanol is added. The mixture is stirred at 60° C. for 4 hours, and then is allowed to cool and crystallize. The solids are filtered, washed with water and dried to yield 5-adamantyl-5-methylhydantoin, melting at 330° C. to 340° C. (decomposition), depending on the rate of heating.

The compounds of the present invention exhibit the utility known for synthetic penicillins generally and, therefore, find use for treatment of bacterial diseases. In particular, these compounds show activity against Pneumococci, Streptococci, and Staphylococci. In addition, these compounds are useful in the treatment of gram-negative organisms and can be used against organisms usually resistant to non-synthetic penicillins.

The compounds of the invention can be administered for the treatment of bacterial diseases by any means that effects contact of the compound with the organism to be controlled. Preferably administration is accomplished orally or intramuscularly.

The dosage administered will be dependent on the organism being treated as well as the age, health, and weight of the recipient, the nature of the effect desired, and the kind of concurrent treatment, if any. Generally, however, for an adult the dosage will be in the range of about 1–6 grams per day. For a child, the dosage usually will be in the range of about 40–120 milligrams per kilogram of body weight per day.

The dosage form for administration of the compounds, of course, will vary depending on the route of administration employed. For oral administration, these compounds can be employed in useful compositions in such dosage forms as tablets, capsules, powder packets, liquid solutions, liquid suspensions, or elixirs. In such compositions, the active compound will ordinarily be present in an amount of at least 0.5% by weight based on the total weight of the composition and not more than 90% by weight. For intramuscular administration, these active compounds can be employed in sterile solutions, preferably a saline solution. These solutions will ordinarily contain from about 0.5% to 25% and preferably about 1 to 10% by weight of the active compound.

Besides the active compound of the invention, these compositions used as dosage forms will contain solid or liquid non-toxic pharmaceutical carriers for the active compound. Suitable pharmaceutical carriers are described in "Remington's Practice of Pharmacy" by E. W. Martin and E. F. Cook, a well known reference text in this field.

The disclosure herein should not be taken as a recommendation to use the disclosed invention in any way without full compliance with U.S. Food and Drug Laws and other laws which cover regulations which may be applicable.

Since many different embodiments of the invention may be made without departing from the spirit and scope thereof, it is to be understood that the invention is not limited by the specific illustrations except to the extent defined in the following claims.

We claim:
1. A compound selected from the group consisting of compounds of the formula

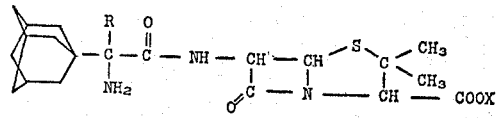

where
R is selected from the group consisting of hydrogen and methyl; and
X is selected from the group consisting of hydrogen and a non-toxic anion.

2. Sodium α-amino-α-methyl-1-adamantylmethyl penicillin.

3. Potassium α-amino-α-methyl-1-adamantylmethyl penicillin.

No references cited.

NICHOLAS S. RIZZO, *Primary Examiner.*